United States Patent [19]
Sawada

[11] Patent Number: 5,433,108
[45] Date of Patent: Jul. 18, 1995

[54] CRANK ANGLE SENSOR FOR INTERNAL COMBUSTION ENGINE AND CYLINDER IDENTIFICATION SYSTEM UTILIZING THE SAME

[75] Inventor: Kenichi Sawada, Saitama, Japan

[73] Assignee: Honda Giken Kogyo Kabushiki Kaisha, Tokyo, Japan

[21] Appl. No.: 172,811

[22] Filed: Dec. 27, 1993

[30] Foreign Application Priority Data

Dec. 29, 1992 [JP] Japan .................................. 4-360920

[51] Int. Cl.⁶ .......................................... G01M 15/00
[52] U.S. Cl. ................................................. 73/117.3
[58] Field of Search .................... 73/116, 117.3, 118.1; 324/207.25, 391, 392; 123/414, 612, 617; 364/431.03, 431.05

[56] References Cited

U.S. PATENT DOCUMENTS 3,864,963  2/1975  Rivere .............................. 73/117.3
4,825,691  5/1989  Sekiguchi ........................... 73/118.1
5,070,726  12/1991 Fukui et al. .......................... 73/116

FOREIGN PATENT DOCUMENTS 3-121237  5/1991  Japan .

Primary Examiner—Robert Raevis
Attorney, Agent, or Firm—Nikaido, Marmelstein, Murray & Oram

[57] ABSTRACT

A crank angle sensor for a multicultural internal combustion engine and a cylinder identification system utilizing the same. The crank angle sensor has a rotor provided with ((number of cylinder/2)+1)) number of projections (markers) at reference positions corresponding to predetermined piston positions of the individual cylinders and two electromagnetic pickups spaced apart by twice the interval between adjacent reference positions. The cylinder is identified by comparing the two output pulse trains of the electromagnetic pickups over two reference positions.

16 Claims, 14 Drawing Sheets

CRANK ANGLE SENSOR FOR INTERNAL COMBUSTION ENGINE AND CYLINDER IDENTIFICATION SYSTEM UTILIZING THE SAME

BACKGROUND OF THE INVENTION

1. Field of the Invention

This invention relates to a crank angle sensor for an internal combustion engine and a cylinder identification system utilizing the same, more particularly to such a sensor and a system which enable cylinder identification to be conducted in a simple manner in a multicylinder internal combustion engine.

2. Description of the Prior Art

As the minimum information required for electronically controlling fuel injection, ignition timing and the like in a multi-cylinder internal combustion engine it is necessary to have at least cylinder identification information and reference piston position information for the respective cylinders. The traditional way of obtaining this information has been to use two rotors (pulsers), provide one rotor with a single marker (projection, slit etc.), provide the other rotor with a number of markers equal to the number of cylinders at positions corresponding to the reference piston positions of the respective cylinders, accommodate the rotors in a distributor, for example, and rotate them synchronously with the rotation of the engine, and obtain the information by detection using two electromagnetic conversion means or optical detection means fixed opposite the rotors.

Since this method required two rotors, there was developed a method using a single rotor having two types of markers (slits), one for cylinder identification and the other for reference position detection, and carrying out the detection with two optical detection means. In addition, Japanese Laid-open Patent Publication No. Hei 3(1991)-121,237 teaches an improvement on this method in which the number of cylinder identification markers is increased to two so as to enable cylinder identification in a half turn of the rotor. More specifically, in the method disclosed in this laid-open patent publication a number of reference position markers equal to the number of cylinders are provided on the outer periphery of the rotor, two cylinder identification markers are provided on the inner periphery of the rotor as offset in phase by 180°, the logic state of the values detected by two pairs of optical detection means disposed opposite the rotor is stored in memory beforehand for each reference position and the cylinder with which each reference position is associated is identified from the stored logic states.

However, these earlier proposed techniques lead to structurally complicated devices since they require provision of two types of markers in the radial direction of the rotor. They also limit where the device can be installed since installation is not possible at a place where a large space cannot be secured in the radial direction of the rotor.

SUMMARY OF THE INVENTION

One object of this invention is therefore to overcome the aforesaid drawbacks of the prior art by providing a crank angle sensor for an internal combustion engine and a cylinder identification system utilizing the same which enable cylinder identification and reference position detection with a simple configuration.

In addition, in electronic control of an internal combustion engine it is preferable to be able to make cylinder identification in even less than the half turn of the rotor that has been made possible by the technique of Japanese Laid-open Patent Publication No. Hei 3(1991)-121,237.

It is therefore another object of the invention to improve on this point, specifically to provide a crank angle sensor for an internal combustion engine and a cylinder identification system utilizing the same which enables cylinder identification within an angle of rotation less than a half turn.

For realizing these objects, the present invention provides a crank angle sensor for a multicylinder internal combustion engine having n cylinders, comprising a rotor which rotates synchronously with the rotation of the engine, a plurality of markers, whose number m being $m=(n/2)+1$ (where n, m are integers), and respective of which being provided on the rotor at one of reference positions, spaced apart by $360/n$ degrees interval with respect to the center of the rotor, which indicate predetermined piston positions at the individual cylinders and a plurality of signal output means each located in the vicinity of the rotor to output a signal each time the markers pass by, the signal output means being separated from each other by an interval such that an angle formed with respect to the center of the rotor is at least an integral multiple of the $360/n$ degrees. In the crank angle sensor the markers and the signal output means being disposed such that at least one of the signal output means outputs the signal at one of the reference positions.

BRIEF DESCRIPTION OF THE DRAWINGS

These and other objects and advantages of the invention will be more apparent from the following description and drawings, in which.

DETAILED DESCRIPTION OF THE PREFERRED EMBODIMENTS

Figure 1:
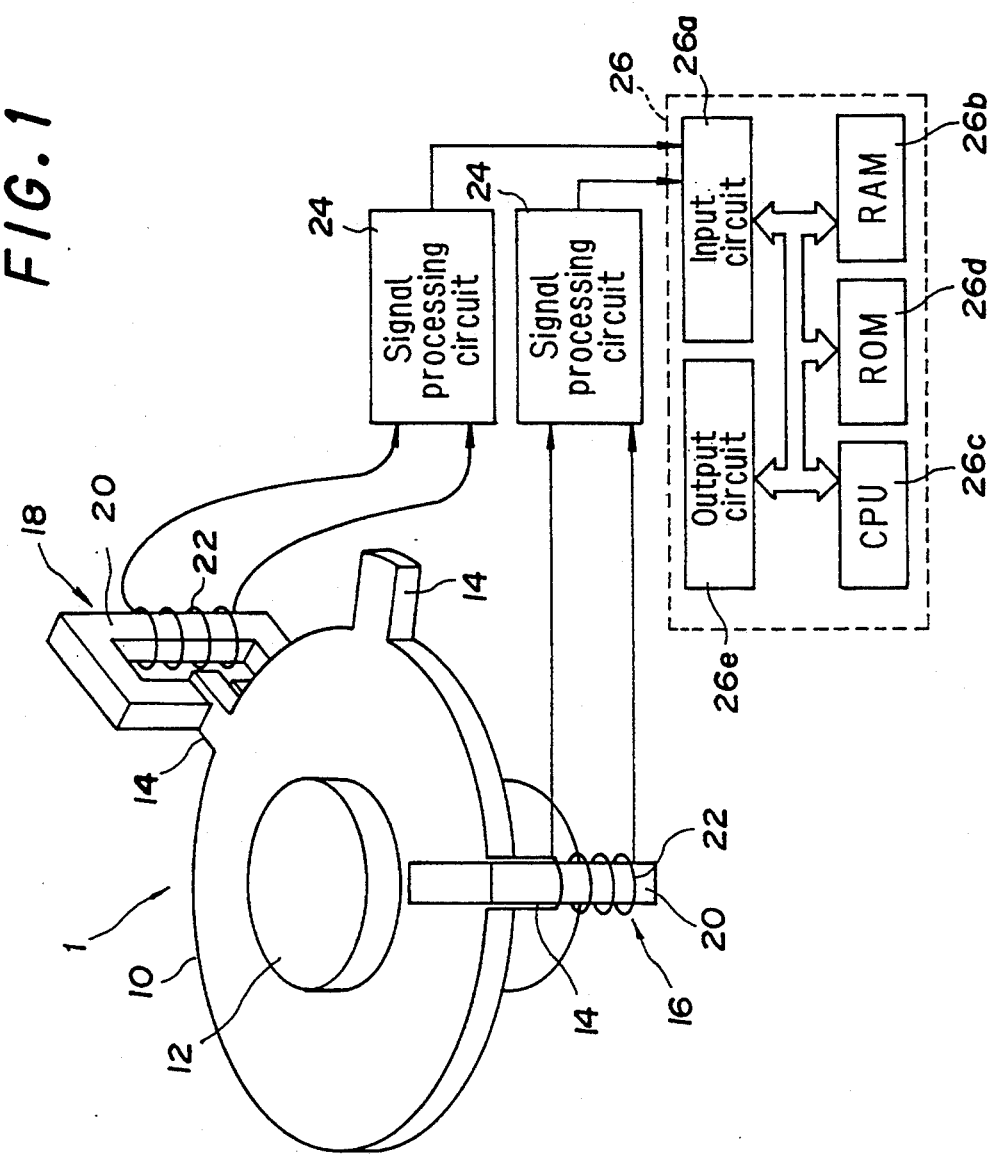
FIG. 1 is a schematic overview of a crank angle sensor for an internal combustion engine and a cylinder identification system utilizing the same according to the present invention, shown, by way of example, as applied to a five-cylinder internal combustion engine.

FIG. 1 is a perspective view of a crank angle sensor 1 according to the present invention. The crank angle sensor 1 is equipped with a rotor (pulser) 10 constituted as a steel disk and mounted on a cam shaft 12 of a five-cylinder internal combustion engine (not shown) so as to rotate synchronously with the rotation of the engine. Projections (markers) 14 are provided at three positions on the rotor 10 and two electromagnetic pickups (signal output means) 16, 18 are provided in the vicinity thereof. The electromagnetic pickups 16, 18 themselves are of known configuration, each comprising a permanent magnet 20 of square C shape in sectional view and being disposed in the vicinity of the rotor 10 so that the projections 14 of the rotor 10 pass between the opposing pole pieces of the permanent magnet. A coil 22 is wound about each permanent magnet 20 and an electromagnetic force is produced in the coil 22 each time a projection 14 passes through the pickup. The outputs of the electromagnetic pickups 16, 18 are sent through signal processing circuits 24 to an electronic control unit 26 constituted as a microcomputer.

Figure 2:
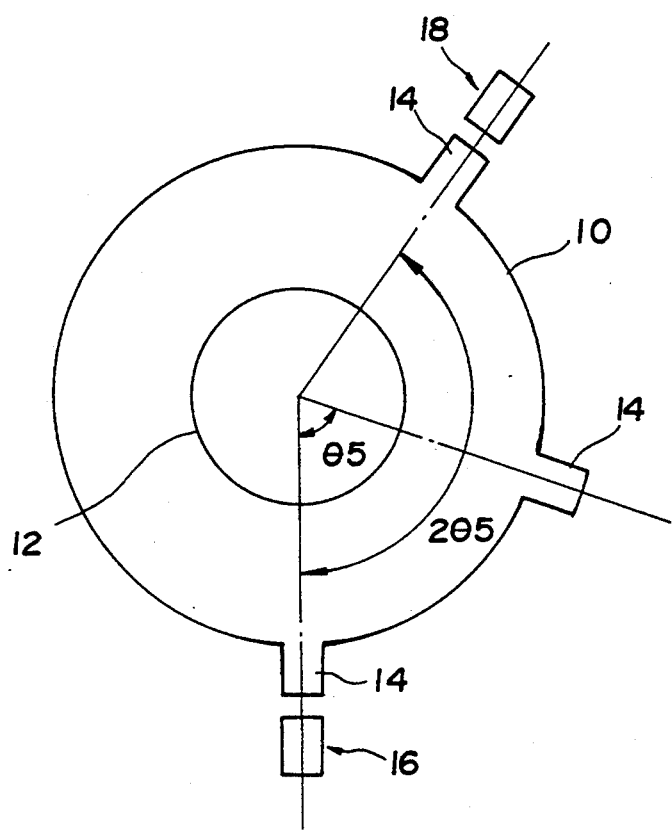
FIG. 2 is a plan view for explaining an example of the positional relationship between crank angle sensor markers (projections) and signal output means (electromagnetic pickups) of the crank angle sensor of FIG. 1.

The crank angle sensor according to the present invention is characterized by the relationship between the positions at which the projections 14 of the rotor 10 are formed and the positions at which the electromagnetic pickups 16, 18 are disposed. FIG. 2 is a plan view that will be used to explain the crank angle sensor 1 shown in FIG. 1 taking a five-cylinder internal combustion engine as an example. Three projections 14 are formed on the periphery of the rotor 10, the first at a reference piston position, the second at a position separated therefrom by a spacing angle $\theta 5$ (72°) and the third at a position separated from the second by the spacing angle $\theta 5$. The remaining two reference positions are not formed with projections. The two electromagnetic pickups 16, 18 are positioned on an arc concentric with the rotor so as to be separated by an angle that is at least twice the reference piston position spacing angle $\theta 5$, i.e. by at least $2\theta 5$ (144°). As a result, the signals obtained through the signal processing circuits 24 are as shown in FIG. 3.

Figure 3:
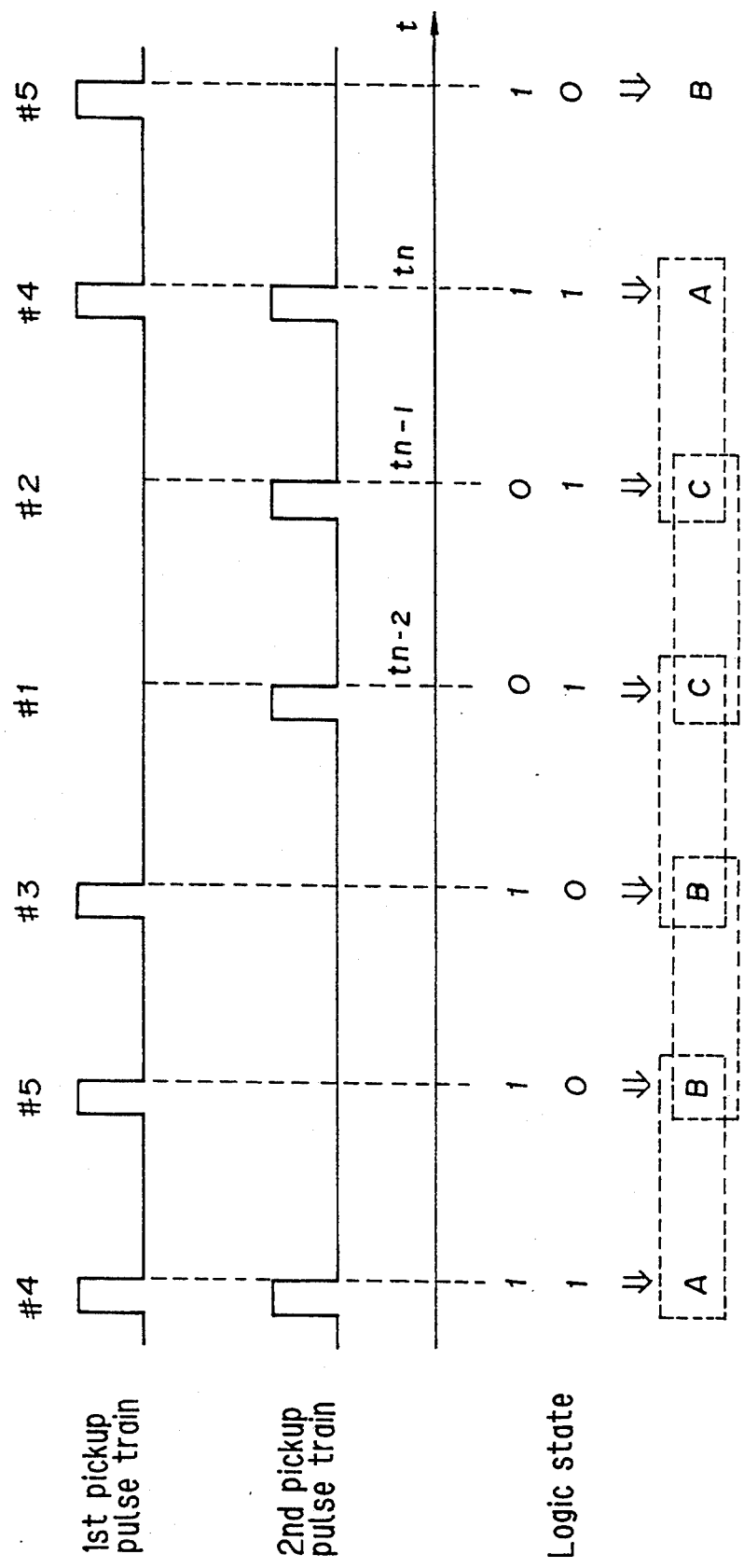
FIG. 3 is a timing chart showing the outputs of the signal output means (electromagnetic pickups) of the system of FIG. 1.

In FIG. 3, the upper pulse train shows the output obtained from the first electromagnetic pickup 16 and the lower pulse train shows the output obtained from the second electromagnetic pickup 18. Since as explained above the electromagnetic pickups 16, 18 are positioned on an arc concentric with the rotor so as to be separated from each other by twice the reference position spacing (angle) $\theta 5$ (i.e., by $2\theta 5$), the output pulse trains of the first and second electromagnetic pickups 16, 18 compliment each other and, as a result, at the reference positions the reference position logic state always assumes high level in at least one of the pulse trains even though only three projections are provided for five reference positions. This makes it possible to detect the reference positions of the five cylinders from the rise points of the pulses.

Defining the firing order as 4, 5, 3, 1, 2, the logic states of the outputs of the first and second electromagnetic pickups at the reference positions can be written as follows (where 1 means high level, 0 means low level and the output of the first electromagnetic pickup is shown first):

4th cylinder: 1 1
5th cylinder: 1 0
3rd cylinder: 1 0
1st cylinder: 0 1
2nd cylinder: 0 1

The number of combinations of 1 and 0 in the foregoing is $2^2$ minus the one combination (0, 0) that is not used (since, as explained above, one or the other of the outputs is always at high level), namely three combinations, which is insufficient for identifying all five cylinders. However, if the logic states at the preceding reference positions are also taken into consideration, we get:

4th cylinder: 1 1, 0 1
5th cylinder: 1 0, 1 1
3rd cylinder: 1 0, 1 0
1st cylinder: 0 1, 1 0
2nd cylinder: 0 1, 0 1 In other words, if the projections and electromagnetic pickups are arranged in the manner of FIGS. 1 to 3 so that the logic states at two reference positions are different for each reference position, it becomes possible to identify $3^2=9$ combinations. The invention is based on this concept.

The pulse signals processed by the signal processing circuits 24 in FIG. 1 are input to an input circuit 26a of the electronic control unit 26 and then stored in a RAM (random access memory) 26b. Although not shown in drawings, a second crank angle sensor is installed at an appropriate position near the crankshaft (not shown) or the like for producing a signal once every subdivided unit angle of, for example, 5 or 10 degrees. A CPU (central processing unit) 26c operating in accordance with instructions stored in a ROM (read-only memory) 26d identifies which cylinder each reference position is associated with, by operations that will be explained below, and also detects the engine operating condition from the outputs of another group of sensors (not shown), calculates control values for fuel injection, ignition timing etc., and outputs the calculated control values through an output circuit 26e to a fuel injection system and an ignition system (neither shown).

The cylinder identification operation will now be explained with reference to the flow chart of FIG. 4.

First, in S10, the outputs of the signal processing circuits 24 are fetched and the aforesaid output pulse signals are recognized and updated. The program then passes to S12 in which it is checked if any wire of the sensor including the coil have been broken or cut. This is achieved by checking whether or not an output pulse signal has been produced over a range of prescribed crank angles. If the wire break is discovered, the program passes to S14 in which fail-safe processing is conducted.

Normally the result of S12 is negative and the program passes to S16 in which a decision is made as to whether or not the logic state of the positions (reference positions) at which pulse signals are (or a pulse signal is) currently being output by the first and/or second pickup, e.g., the logic state at time tn in FIG. 3, is A. Here the logic states of the first and second electromagnetic pickup outputs are replaced with A, B and C in the following manner:

A : First electromagnetic pickup output=1 Second electromagnetic pickup output=1
B : First electromagnetic pickup output=1 Second electromagnetic pickup output=0
C : First electromagnetic pickup output=0 Second electromagnetic pickup output=1

If the result in S16 is affirmative, the program passes to S18 which decides whether or not the logic state one reference position (one time) earlier (at tn−1) was C. If the result is affirmative, the program passes to S20 which decides whether or not the logic state two reference positions earlier (at tn−2) was C. If the result is affirmative, the program passes to S22 which decides that the cylinder associated with the current (at tn) reference positions is the fourth cylinder. As is clear from the timing chart of FIG. 3, for the fourth cylinder the logic state two reference positions earlier should have been C. When the result in S20 is negative, therefore, it is decided that a failure occurred in one of the signal processing circuits 24, for example, and the program is passed to the sensor failure discrimination subroutine indicated by the subroutine flow chart at the left side of FIG. 4 for conducting appropriate processing.

When S16 finds that the logic state of the current reference positions is not A, the program passes to S24 which decides whether or not it is B. If the result is affirmative, the program passes to S26 which decides whether or not it was A one time earlier. If the result is affirmative, the program passes to step 28 which decides whether or not it was C two times earlier. If the result is affirmative, the program passes to S30 which decides that the current reference position is that of the fifth cylinder. Otherwise it is decided that a failure occurred. When the result in S24 is negative or when the result in S26 is negative, the program passes through S32–S48 in which similar processing is conducted for determining which cylinder is at the reference position and for deciding whether or not a failure occurred.

Figure 4:
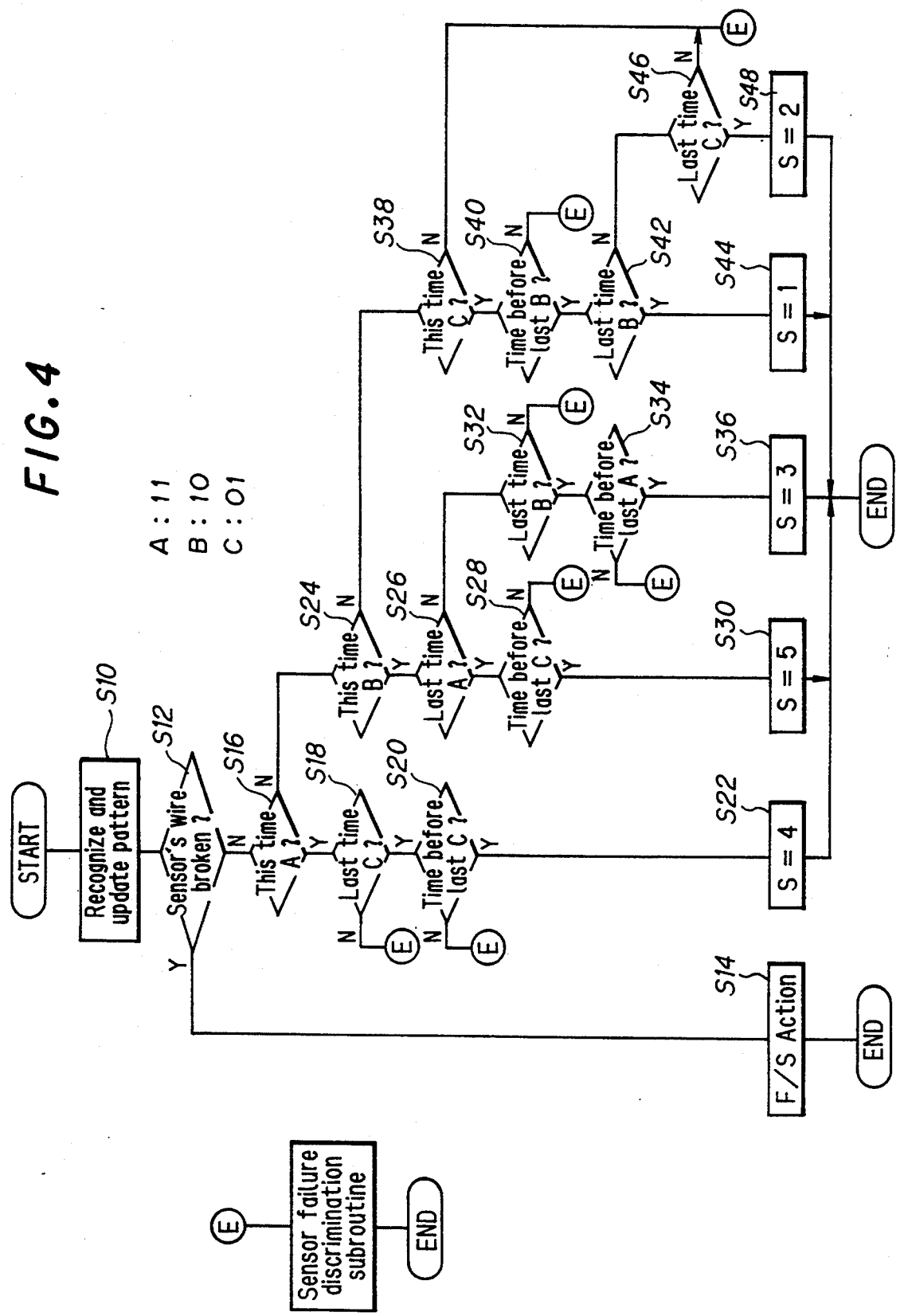
FIG. 4 is a flow chart showing the operations of the system of FIG. 1.

Since the FIG. 4 flow chart routine determines not only which cylinder the current reference position is associated with but also whether or not a failure occurred, its check of the logic state has to go back to two reference positions earlier. However, as will be understood from the timing chart of FIG. 3, if the object is only to identify which cylinder the current reference position is associated with, it suffices to check the logic value back only one time earlier. More specifically, in the case of application to a five-cylinder engine as in this embodiment, it is possible to identify the cylinder with which the current reference position is associated simply by providing three projections at three consecutive reference positions on the single rotor 10, disposing the two electromagnetic pickups 16, 18 at the illustrated positions, and rotating the rotor 10 by (360/5)×2=144 [degrees]. Moreover, the simplicity of the configuration means that there is little restriction on where the system can be installed and also enables reductions in both the number of component parts and fabrication cost. In addition, the ease with which the system is able to conduct cylinder identification makes it particularly useful in engines with electronic distributor type ignitions systems that require cylinder identification information.

Figure 5:
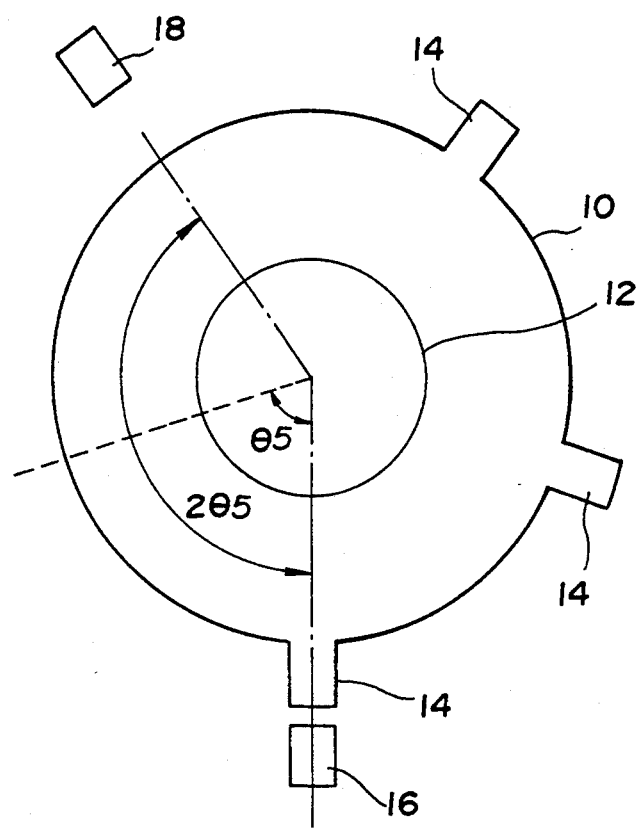
FIG. 5 is a plan view for explaining another example of the positional relationship between the crank angle sensor markers (projections) and the signal output means (electromagnetic pickups), according to a second embodiment of the invention.
Figure 6:
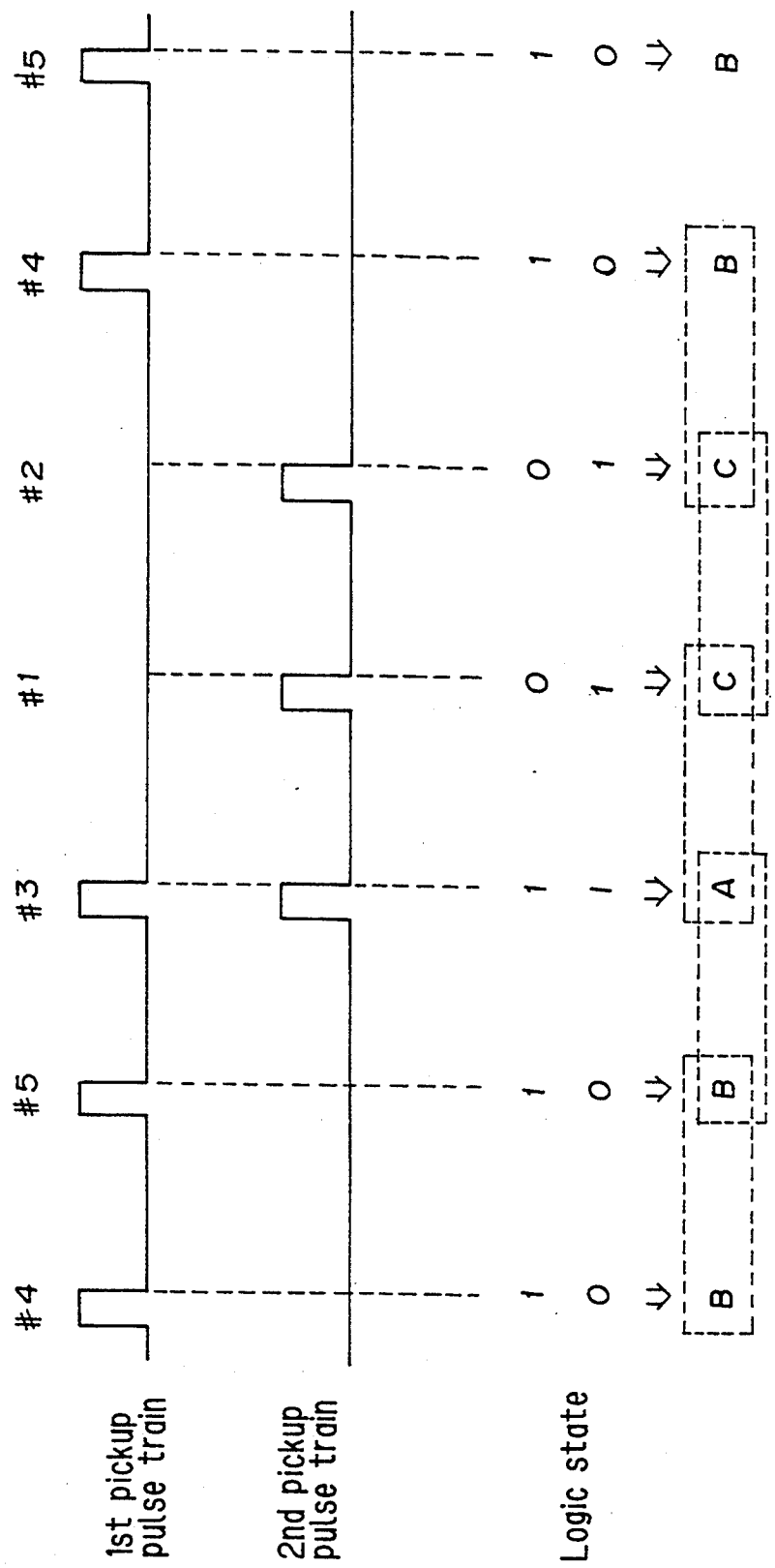
FIG. 6 is a timing chart showing the outputs of the signal output means (electromagnetic pickups) of FIG. 5.

FIG. 5 shows another example of the positioning of the electromagnetic pickups 16, 18 in a five-cylinder engine and FIG. 6 is the corresponding timing chart. The illustrated arrangement is able to achieve the same effect as that shown in FIG. 2 since the electromagnetic pickups 16, 18 are again disposed opposite the rotor so as to be separated by an angle equal to twice that between adjacent reference positions.

Figure 7:
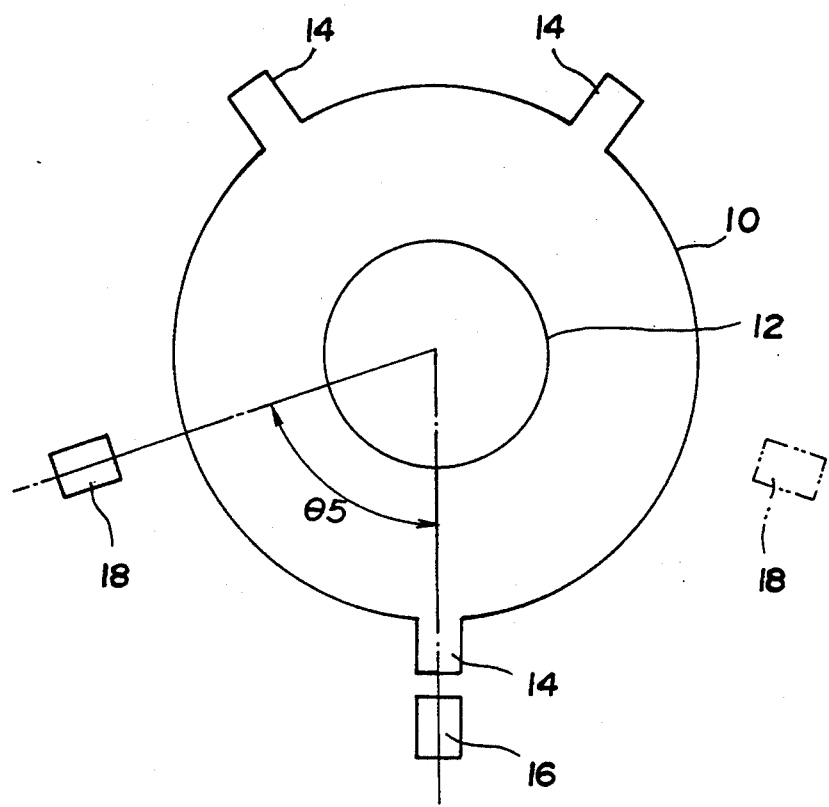
FIG. 7 is a plan view for explaining another example of the positional relationship between the crank angle sensor markers (projections) and the signal output means in a five-cylinder internal combustion engine, according to a third embodiment of the invention.
Figure 8:
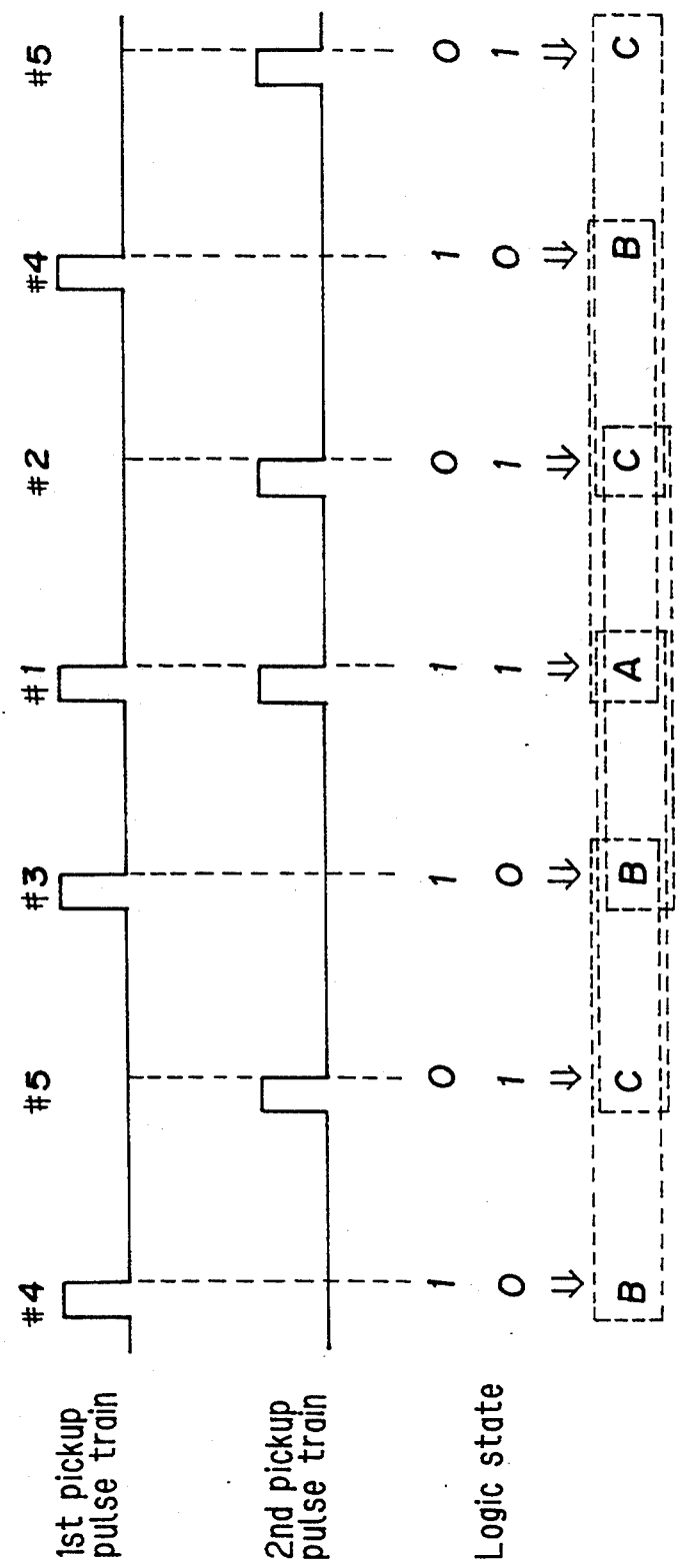
FIG. 8 is a timing chart showing the outputs of the signal output means (electromagnetic pickups) of FIG. 7.

FIG. 7 shows another arrangement for a five-cylinder engine (the third embodiment) and FIG. 8 is the corresponding timing chart. In this third embodiment, the projections 14 are not provided at consecutive reference positions, namely, one of them is separated from the other two, and the electromagnetic pickups 16, 18 are disposed at adjacent positions. Although this arrangement causes some of the cylinders to have the same logic state at two reference positions as illustrated in FIG. 8, it will be understood from the figure that it is possible to identify which cylinder a reference position is associated with by comparing the logic states at three reference positions. In this embodiment, the electromagnetic pickup 18 can instead be located at the position indicated by phantom lines in FIG. 7.

Figure 9:
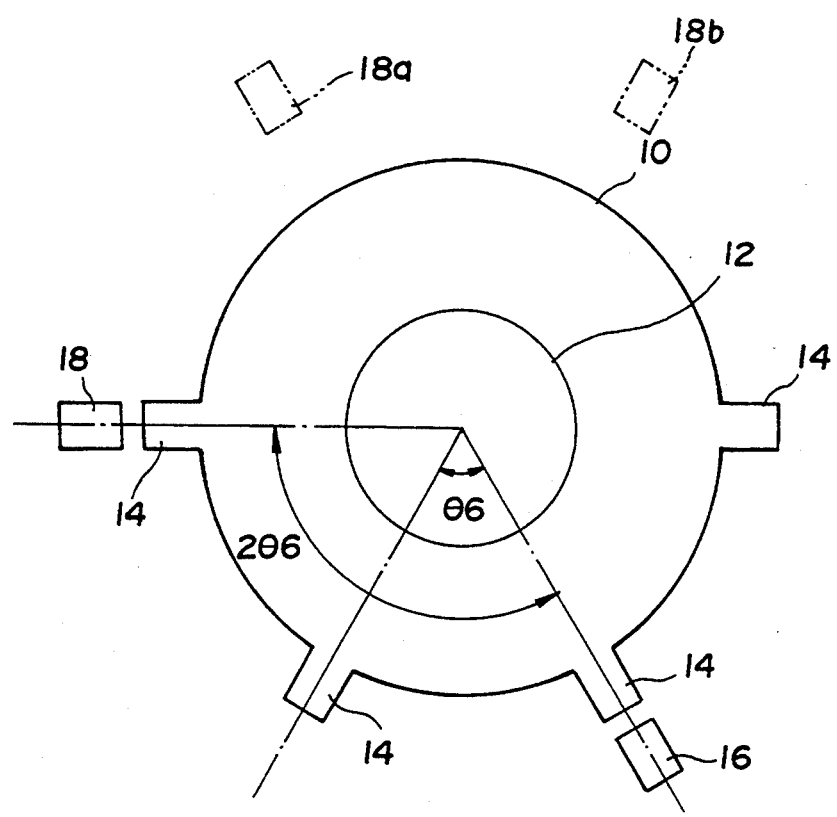
FIG. 9 is a plan view for explaining an example of the positional relationship between the crank angle sensor markers (projections) and the signal output means (electromagnetic pickups) in a six-cylinder engine, according to a fourth embodiment of the invention.
Figure 10:
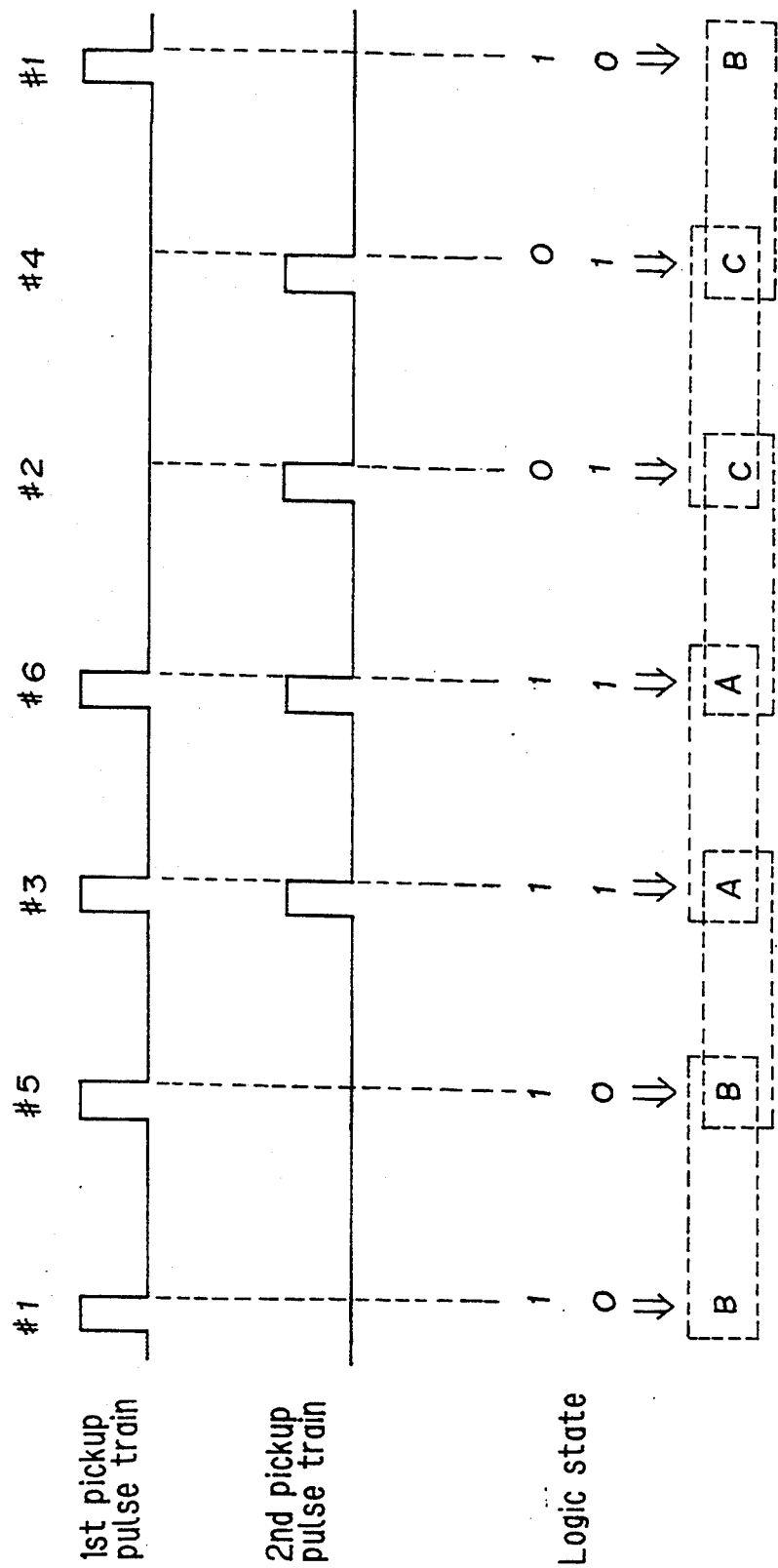
FIG. 10 is a timing chart showing the outputs of the signal output means (electromagnetic pickups) of FIG. 9.

FIG. 9 shows a fourth embodiment of the invention adapted for use with a six-cylinder internal combustion engine. In this embodiment, the rotor 10 is provided projections 14 at four of its six reference positions and, similarly to in the first embodiment, the electromagnetic pickups 16, 18 are provided on an arc concentric with the rotating body so as to be separated from each other by at least twice the reference position spacing angle $\theta 6$ (i.e., by at least $2\theta 6$). As will be understood from the corresponding timing chart of FIG. 10, even when there are six cylinders the cylinder with which a reference position is associated can be identified in a manner similar to that in the first embodiment, namely, simply by comparing the logic states of two reference positions; that is, simply by rotating the rotor by (360/6)×2=120 [degrees]. The second electromagnetic pickup 18 can instead be located at the position 18a or 18b as indicated by phantom lines in FIG. 9.

Figure 11:
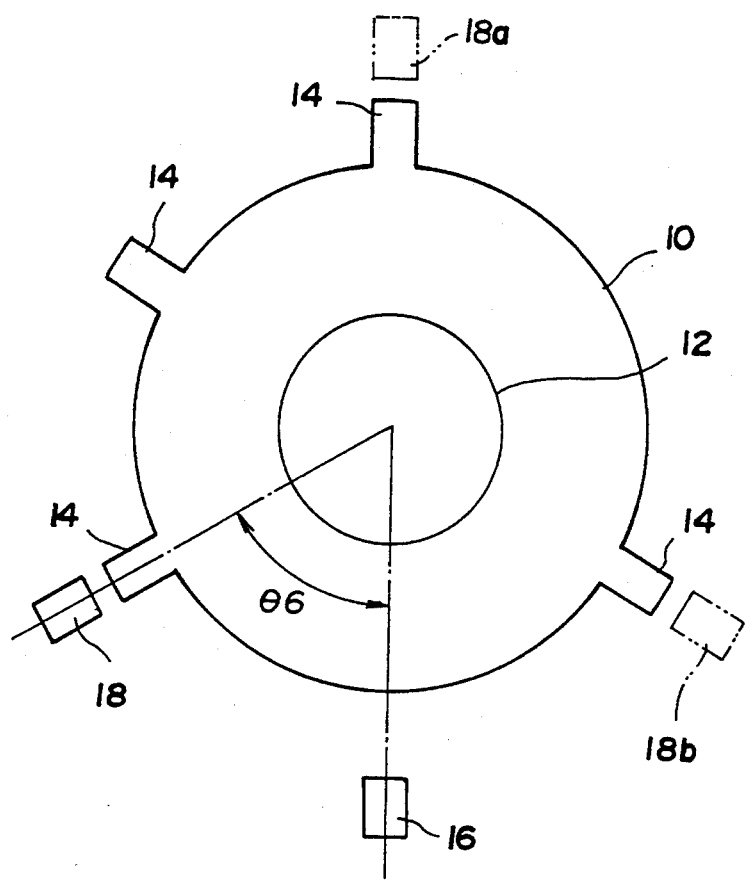
FIG. 11 is a plan view for explaining another example of the positional relationship between the crank angle sensor markers (projections) and the signal output means (electromagnetic pickups) in a six-cylinder engine, according to a fifth embodiment of the invention.
Figure 12:
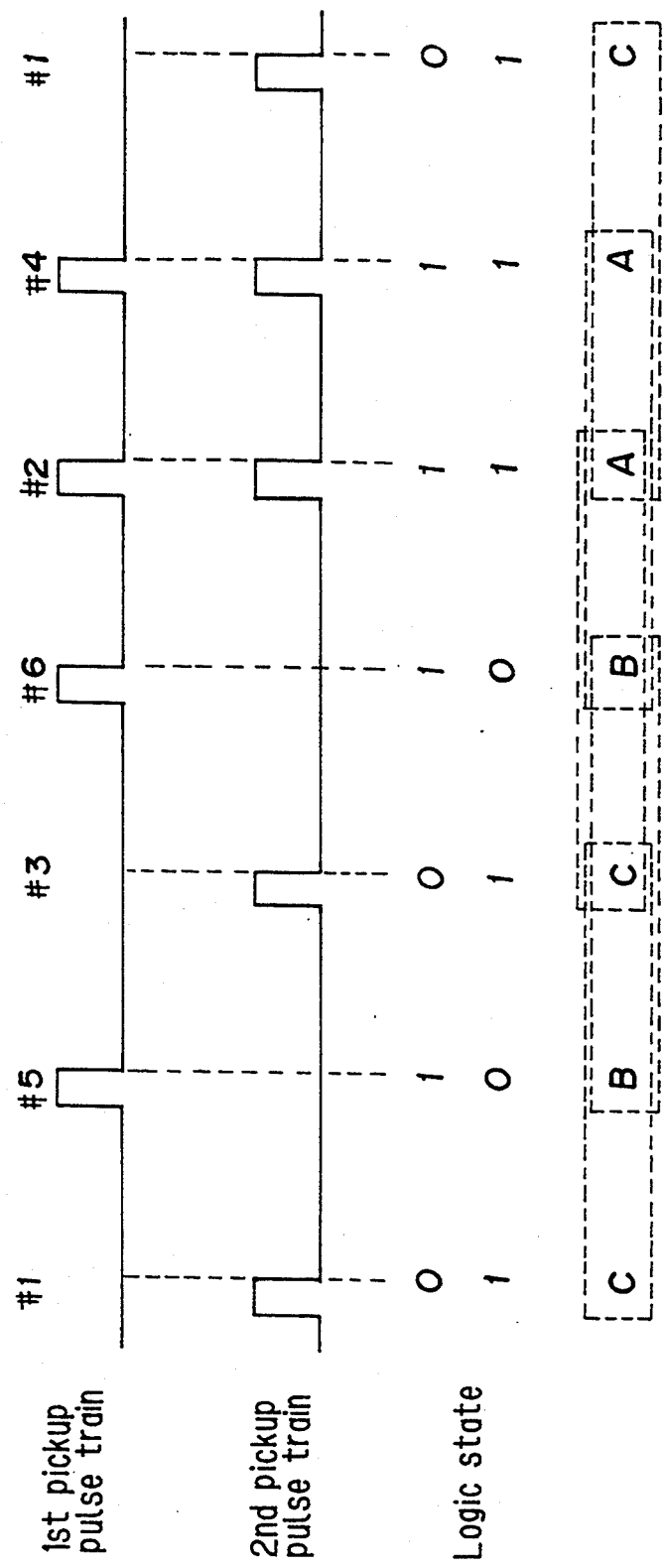
FIG. 12 is a timing chart showing the outputs of the signal output means (electromagnetic pickups) of FIG. 11.

FIG. 11 shows another arrangement for a six-cylinder engine according to a fifth embodiment of the invention and FIG. 12 is the corresponding timing chart. This embodiment is similar to the third embodiment in that one of the projections 14 is located at a position not consecutive with the others. Therefore, as in the third embodiment, the cylinder associated with a reference position can be identified by comparing the logic state at three reference positions. In this embodiment, the second electromagnetic pickup 18 can instead be located at the position 18a or 18b as indicated by phantom lines.

Thus, to state the arrangement according to this invention in general terms: where the number of cylinders is n, the number of markers (projections) m is defined as $m = (n/2) + 1$ (where m is an integer)

and the m number of markers are arranged at consecutive ones of a number of reference positions equal to the number of cylinders. In addition, two electromagnetic pickups are disposed such that a pulse is always output at at least one of the reference positions and the logic states thereof at the reference positions differ in value from each other through two reference positions. As a result, it is possible to identify up to $3^2 = 9$ cylinders. (When the number of cylinders is larger than nine, the logic states at three or more reference positions, namely at at least $3^3 = 27$ reference positions, are compared). The same applies when the markers (projections) are not all at consecutive reference positions.

Owing to the aforesaid configuration, the invention is able to identify the cylinders with which the individual reference positions are associated in an engine with nine or fewer cylinders by comparing the logic states output by two electromagnetic pickups at two reference positions and, moreover, the identification can be made by rotating the rotor by (360/number of cylinders)×2 [degrees]. In addition, when the markers (projections) are at non-consecutive positions or when the engine has more than nine cylinders, the reference position can be identified by comparing the logic states output by two electromagnetic pickups at three or more reference positions. Moreover, since the configuration is simple, there are few limitations on place of installation, the number of component parts is small, and the fabrication cost is low.

The embodiments described in the foregoing can be modified to increase the number of electromagnetic pickups and reduce the number of reference positions to be compared.

Figure 13:
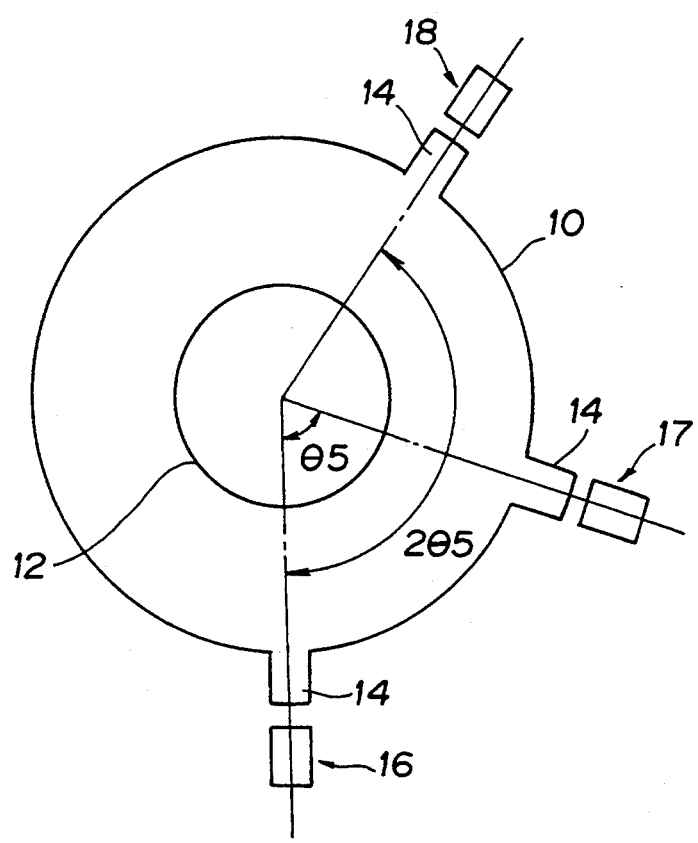
FIG. 13 is a plan view for explaining another example of the positional relationship between the crank angle sensor markers (projections) and the signal output means (electromagnetic pickups) in a five-cylinder engine, according to a sixth embodiment of the invention.
Figure 14:
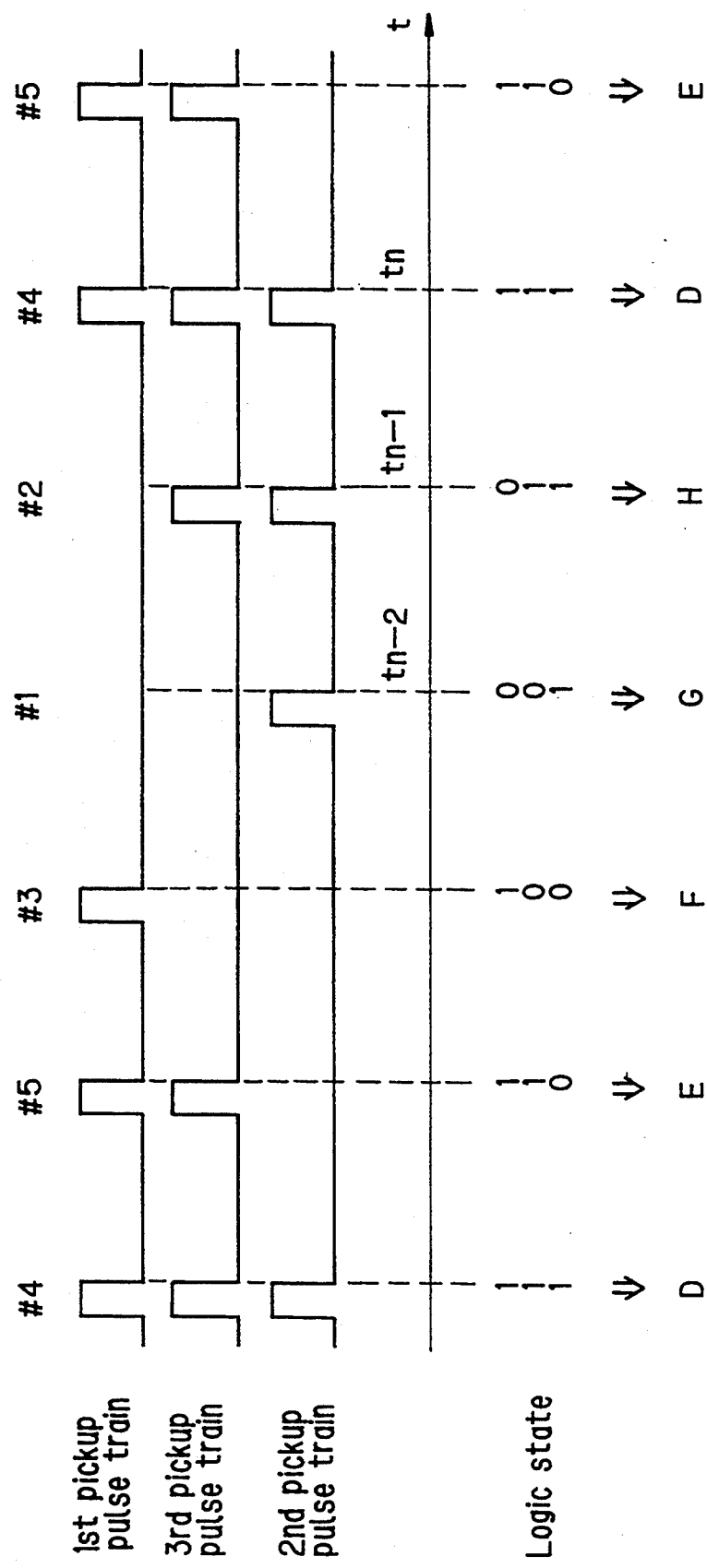
FIG. 14 is a timing chart showing the outputs of the signal output means (electromagnetic pickups) of FIG. 13.

FIG. 13 shows such an arrangement for a five-cylinder engine according to a sixth embodiment of the invention and FIG. 14 is the corresponding timing chart. In this embodiment, a third electromagnetic pickup 17 is provided. As will be seen from FIG. 14, the logic states of the pickups comprises of three values so that the cylinder can be identified by comparing the logic state at one reference position by the predetermined values "111", "110", "100", "001", "011" designated by "D" through "H" in the figure. Further, it will be easily understood from the sixth embodiment that the second through the fifth embodiments can similarly be modified to have three or more pickups.

Furthermore, while the embodiments described in the foregoing use the rotor whose markers are constituted as projections and employ electromagnetic pickups as signal output means, the invention is not limited to this arrangement and it is possible instead to use another type of electromagnetic conversion means such as Hall elements or to constitute the markers as slits and use optical signal output means. Which is to say that invention does not particularly specify the detection method used.

The present invention has thus been shown and described with reference to specific embodiments. However, it should be noted that the present invention is in no way limited to the details of the described arrangements but changes and modifications may be made without departing from the scope of the appended claims.

What is claimed is:

1. A crank angle sensor for a multicylinder internal combustion engine having n cylinders, comprising:
    a rotor which rotates synchronously with the rotation of the engine;
    a plurality of makers, whose total number m being $m = (n/2) + 1$ (where n, m are integers), and said plurality of makers being provided on the rotor at one of the reference positions, spaced apart by 360/n degrees interval with respect to the center of the rotor, which indicate predetermined piston positions at the individual cylinders; and
    a plurality of signal output means each located in the vicinity of the rotor to output a signal each time the markers pass by, the signal output means being separated from each other by an interval such that an angle formed with respect to the center of the rotor is at least an integral multiple of the 360/n degrees;
    wherein
        the markers and the signal output means being disposed such that at least one of the signal output means outputs a signal at each of the reference positions.

2. A crank angle sensor according to claim 1, wherein the markers are provided at the reference positions consecutively.

3. A crank angle sensor according to claim 1, wherein the markers are provided at the reference positions non-consecutively.

4. A crank angle sensor according to claim 1, wherein the plurality of the signal output means are two signal output means.

5. A crank angle sensor according to claim 4, wherein the two signal output means are electromagnetic pickups and the markers are projections projected from the rotor radially.

6. A crank angle sensor according to claim 5, wherein the electromagnetic pickups have magnets of square C shape in cross section such that the projections pass between the opposing pole pieces of the magnets.

7. A cylinder identification system for an internal combustion engine have n cylinders, comprising:
    a rotor which rotates synchronously with the rotation of the engine;
    a plurality of markers, whose total number m being $m = (n/2) + 1$ (where n, m are integers), and said plurality of markers being provided on the rotor at one of the reference positions, spaced apart by 360/n degrees interval with respect to the center of the rotor, which indicate predetermined piston positions at the individual cylinders;
    a plurality of signal output means each located in the vicinity of the rotor to output a signal each time the markers pass by, the signal output means being separated from each other by an interval such that an angle formed with respect to the center of the rotor is at least an integral multiple of the 360/n degrees, the signal output means being disposed with respect to the marker such that at least one of the signal output means outputs a signal at each of the references positions;
    storing means for storing data indicating presence/absence of the signal of the signal output means at least at first and second reference positions;

comparing means for comparing the stored data with predetermined data; and cylinder identifying means for identifying the cylinder at the second reference position when the stored data coincide with the predetermined data.

8. A system according to claim 7, wherein the plurality of the signal output means are two signal output means.

9. A system according to claim 8, wherein the first and the second reference positions are consecutive.

10. A cylinder identification system for an internal combustion engine have n cylinders, comprising:

a rotor which rotates synchronously with the rotation of the engine;

a plurality of markers, whose total number m being $m=(n/2)+1$ (where n, m are integers), and said plurality of markers being provided on the rotor at one of the reference positions, spaced apart by $360/n$ degrees interval with respect to the center of the rotor, which indicate predetermined piston positions at the individual cylinders;

a plurality of signal output means each located in the vicinity of the rotor to output a signal each time the markers pass by, the signal output means being separated from each other by an interval such that an angle formed with respect to the center of the rotor is at least an integral multiple of the $360/n$ degrees, the signal output means being disposed with respect to the marker such that at least one of the signal output means outputs a signal at each of the references positions;

storing means for storing data indicating presence/absence of the signal of the signal output means at least at first, second and third reference positions;

comparing means for comparing the stored data with predetermined data; and cylinder identifying means for identifying the cylinder at the third reference position when the stored data coincide with the predetermined data.

11. A system according to claim 10, wherein the plurality of the signal output means are two signal output means.

12. A system according to claim 11, wherein the first, the second and the third reference positions are not consecutive.

13. A cylinder identification system for an internal combustion engine having n cylinders, comprising:

a crank angle sensor, including:

a rotor which rotates synchronously with the rotation of the engine;

a plurality of markers, whose total number m being $m=(n/2)+1$ (where n, m are integers), and said plurality of markers being provided on the rotor at one of the reference positions, spaced apart by $360/n$ degrees interval with respect to the center of the rotor, which indicate predetermined piston positions at the individual cylinders;

a plurality of signal output means each located in the vicinity of the rotor to output a signal each time the markers pass by, two signal output means being separated from each other by an interval such that an angle formed with respect to the center of the rotor is at least an integral multiple of the $360/n$ degrees, the signal output means being disposed with respect to the marker such that at least one of the signal output means outputs a signal at each of the reference positions;

storing means for storing data indicating presence/absence of the signal of the signal output means at least at first, second and third reference positions;

comparing means for comparing the stored data with a first predetermined data and a second predetermined data;

cylinder identifying means for identifying the cylinder at the second reference position when the stored data coincide with the first predetermined data; and discriminating means for discriminating that the crank angle sensor fails when the stored data does not coincide with the predetermined data.

14. A system according to claim 13, wherein the plurality of the signal output means are two signal output means.

15. A system according to claim 14, wherein the first, the second and the third reference positions are consecutive.

16. A system according to claim 15, wherein the first predetermined data are those for the first and the second reference positions and the second predetermined data are those for the first, the second and third reference positions.

* * * * *

UNITED STATES PATENT AND TRADEMARK OFFICE
CERTIFICATE OF CORRECTION

PATENT NO. : 5,433,108
DATED : July 18, 1995
INVENTOR(S) : SAWADA

It is certified that error appears in the above-indentified patent and that said Letters Patent is hereby corrected as shown below:

Column [8], line 8 please delete "makers", insert therefor --markers--. Line 10 please delete "makers", insert therefor --markers--.

Column [9], line 11 please delete "have" insert therefor --having--.

Column [10], line 19 please delete "degrees" insert therefor --degrees;--.

Signed and Sealed this

Fifteenth Day of April, 1997

Attest:

BRUCE LEHMAN

*Attesting Officer*     *Commissioner of Patents and Trademarks*